(12) United States Patent
Sabol

(10) Patent No.: US 8,588,853 B2
(45) Date of Patent: Nov. 19, 2013

(54) FEMTOCELL CONFIGURATION

(75) Inventor: Eric Sabol, Mountain View, CA (US)

(73) Assignee: Raytheon Applied Signal Technology, Inc., Sunnyvale, CA (US)

( * ) Notice: Subject to any disclaimer, the term of this patent is extended or adjusted under 35 U.S.C. 154(b) by 113 days.

(21) Appl. No.: 12/911,665

(22) Filed: Oct. 25, 2010

(65) Prior Publication Data

US 2012/0099569 A1    Apr. 26, 2012

(51) Int. Cl.
*H04M 1/00* (2006.01)

(52) U.S. Cl.
USPC ........ 455/561; 455/456.5; 455/524; 455/525; 375/240.27; 375/243

(58) Field of Classification Search
USPC .......... 455/456.5, 524, 525, 561; 375/240.27, 375/243
See application file for complete search history.

(56) References Cited

U.S. PATENT DOCUMENTS

| | | | |
|---|---|---|---|
| 5,724,513 A | 3/1998 | Ben-Nun et al. | |
| 2001/0043644 A1* | 11/2001 | Dooley et al. | 375/150 |
| 2004/0001269 A1 | 1/2004 | Itou et al. | |
| 2006/0121907 A1 | 6/2006 | Mori et al. | |
| 2008/0146158 A1 | 6/2008 | Pan et al. | |
| 2009/0047945 A1 | 2/2009 | Zhang et al. | |
| 2009/0099995 A1 | 4/2009 | Tzeng | |
| 2009/0305702 A1 | 12/2009 | Toppinen et al. | |
| 2009/0316649 A1 | 12/2009 | Chen | |
| 2009/0323663 A1 | 12/2009 | Nakatsugawa | |
| 2010/0015921 A1 | 1/2010 | Yavuz et al. | |
| 2010/0099431 A1 | 4/2010 | Sampath et al. | |
| 2010/0111022 A1 | 5/2010 | Chang et al. | |
| 2010/0150109 A1 | 6/2010 | Bradley et al. | |
| 2010/0278132 A1 | 11/2010 | Palanki et al. | |
| 2010/0311343 A1* | 12/2010 | Keerthi | 455/63.1 |

FOREIGN PATENT DOCUMENTS

| | | | |
|---|---|---|---|
| DE | 19920222 A1 | 11/2000 | |
| EP | 1051053 A2 | 11/2000 | |
| WO | 2007027699 A2 | 3/2007 | |
| WO | WO 2010/013032 A1 * | 2/2010 | H04W 24/02 |

OTHER PUBLICATIONS

Written Opinion of the International Searching Authority for International Application No. PCT/US2011/057547, filed Oct. 24, 2011, Written Opinion of the International Searching Authority dated Jan. 24, 2012 and mailed Feb. 23, 2011 (5 pgs.).

(Continued)

*Primary Examiner* — Rafael Pérez-Gutiérrez
*Assistant Examiner* — Thai Vu
(74) *Attorney, Agent, or Firm* — Christie, Parker & Hale, LLP

(57) ABSTRACT

A method and apparatus for configuring a first cellular base station such as a femtocell to operate in a digital cellular telecommunications network includes: placing the first cellular base station in the digital cellular telecommunications network; detecting with a radio receiver at least one second operating cellular base station within the digital cellular telecommunications network; demodulating a first transmission of the at least one second cellular base station transmitter to obtain a first data stream; predictively modifying the first data stream to create a modified first data stream; correlating at least one periodic portion of the modified first data stream to form an enhanced data signal; decoding the enhanced data signal to obtain information; and configuring the first cellular base station with the information.

17 Claims, 2 Drawing Sheets

(56) References Cited

OTHER PUBLICATIONS

International Search Report for International Application No. PCT/US2011/057547, filed Oct. 24, 2011, International Search Report dated Jan. 24, 2012 and mailed Feb. 23, 2011 (2 pgs.).

Meyer et al, "A Man-in-the-Middle Attack on UMTS," WiSe'04, Oct. 1, 2004, Philadelphia, Pennsylvania, USA, ACM 1-58113-925-X/04/0010, pp. 90-97.

"C.I.A. Cell Phone Intercept Apparatus—Wireless Cell Phone Detection and Monitoring System," View Systems Inc. Product Brochure, www.viewsystems.com, Nov. 20, 2006.

Strobel D., "IMSI Catcher," Seminararbeit Ruhr-Universitat Bochum, Jul. 13, 2007.

Approved Judgment of the High Court of Justice Chancery Division Patents Court dated Mar. 11, 2009 in Case No. HC 2006 C02649 between *MMI Research Limited*, Claimant, and (1) *Cellxion Limited* (2) *Cellxion Networks LLC* (3) *Mark Brumpton* (4) *Datong Electronics PLC* (5) *Rohde & Schwarz GmbH & Co. Kg.* (6) *Anthony Timson*, Defendants.

Approved Judgment of the High Court of Justice Chancery Division Patents Court dated Jul. 3, 2009 in case No. HC 2006 C02649 between *MMI Research Limited*, Claimant, and (1) *Cellxion Limted* (2) *Cellxion Networks LLC* (3)*Mark Brumpton* (4) *Datong Electronics PLC* (5) *Rohde & Schwarz GmbH & Co. Kg.* (6) *Anthony Timson*, Defendants.

Paget, C., "Practical Cellphone Spying," Power Point Presentation, Defcon 18, Aug. 1, 2010.

"IMSI-Catcher," Wikipedia encyclopedia entry, http://en.wikipedia.org/wiki/IMSI_catcher, Oct. 23, 2010.

Office action issued in U.S. Appl. No. 12/911,679, filed Oct. 25, 2010, entitled Portable Cellular Base Station Configuration, inventor Eric Sabol, Office action mailed Apr. 2, 2012 (32 pages).

Hendry, Introduction to CDMA [retrieved on Jan. 18, 2012] Retrieved from the Internet: <URL: http://web.archive.org/web/20100105123347/http://www.bee.net/mhendry/vrml/library/cdma/cdma.htm>] Jan. 29, 2010 [from WayBack Machine] (18 pgs.).

Written Opinion of the International Searching Authority for International Application No. PCT/US2011/057549, filed Oct. 24, 2011, Written Opinion of the International Searching Authority dated Jan. 19, 2012 and mailed Jan. 31, 2012 (5 pgs.).

International Search Report for International Application No. PCT/US2011/057549, filed Oct. 24, 2011, International Search Report dated Jan. 19, 2012 and mailed Jan. 31, 2012 (3 pgs.).

Office action issued in U.S. Appl. No. 12/911,679, filed Oct. 25, 2012 entitled Portable Cellular Base Station Configuration, Inventor Eric Sabol, Office action mailed Oct. 2, 2012 (26 pages).

\* cited by examiner

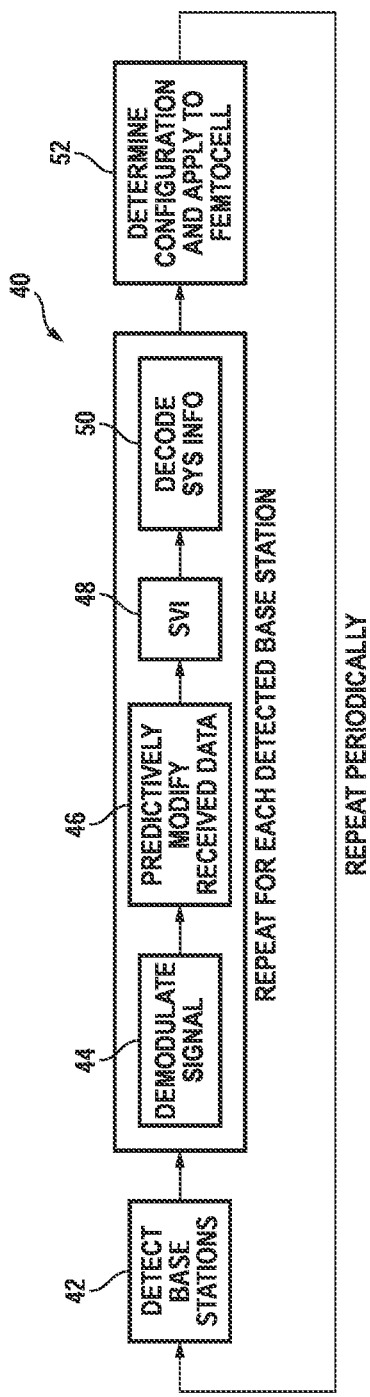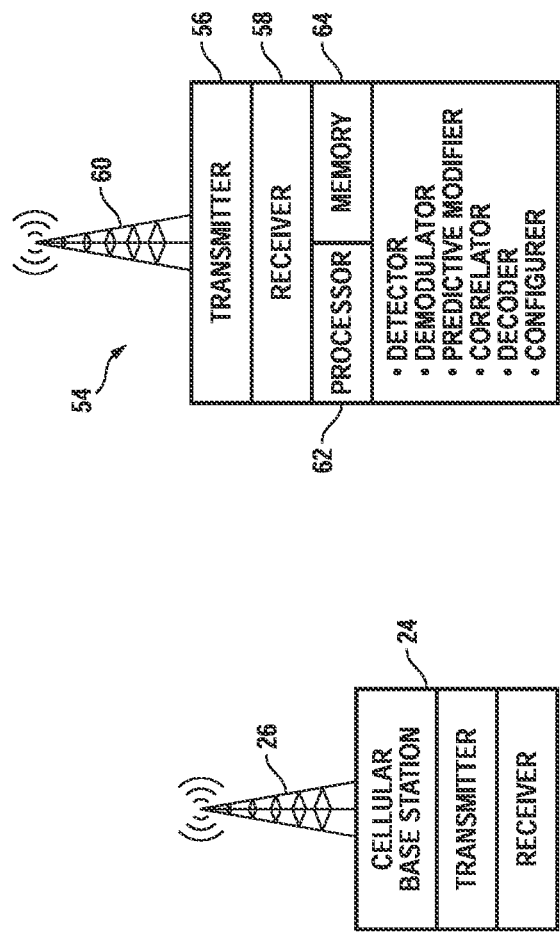

FEMTOCELL CONFIGURATION

RELATED APPLICATION(S)

This application may be considered related to U.S. patent application Ser. No. 12/911,679 entitled "Portable Cellular Base Station Configuration" filed on even date herewith in the name of the same inventor and commonly assigned herewith.

TECHNICAL FIELD

This disclosure is directed to the technical field of digital cellular telecommunications networks.

BACKGROUND

Femtocells are small cellular base stations that are, for example, being offered by network providers and others. A femtocell is intended to constitute a part of a cellular network. Femtocells are usually implemented in order to provide enhanced communications coverage in a relatively small coverage area such as an office building, a home, a subway terminal, or the like. Unlike traditional cellular base stations, which are deployed and configured statically by the network operator, femtocells are generally smaller capacity cellular base stations that are intended to be self-configuring. In principal a user should be able to acquire one, place it within a cellular communications network, turn it on, and have it start working. To accomplish this the femtocell needs to be able to sense its environment with a radio receiver capable of receiving cellular communications network communications and dynamically configure itself in order to minimize interference (and maximize cooperation) with neighboring cells.

The way this is done is to have the femtocell use its radio receiver to periodically survey its environment in order to determine the characteristics of cellular communications networks to which it might attach. An initial survey occurs when the femtocell is first powered on, and then periodic re-surveys are carried out after that.

A first level of the survey is conducted in order to detect nearby base stations from which the Femtocell may obtain information about the cellular communications network. The goal of such detection is to determine the base stations that are present, and identify a few first-order configuration parameters for the femtocell. This step does not involve "drilling down" into signal internals (complete demodulation and decoding). It simply involves (in the example case of a UMTS/WCDMA network) identifying the scrambling code used by each base station heard, and the corresponding received power. This information can then be used to set first-order configuration parameters of the femtocell, such as scrambling code and transmit power.

A second level of the survey is subsequently carried out in order to attempt to recover System Information ("SysInfo") broadcast by each of the base stations detected in the previous step. The SysInfo contains more detailed information useful to the configuring of a cellular base station operating in a cellular communications network. The recovery of SysInfo is done by demodulating each base station signal (converting it from an analog radio signal to a data stream, e.g., of 1's and 0's) and decoding the SysInfo into intelligible information. The femtocell can then use the SysInfo received from other base stations to refine its configuration in order to operate more seamlessly with surrounding base stations.

Demodulation and decoding of SysInfo is limited by signal to interference plus noise ratio ("SINR") (i.e., thermal noise as well as interference from other base stations), so full Sys-Info recovery is typically not feasible for many of the cellular base stations that may be detected. This is particularly true for femtocells as they are designed for home/building use, and the antenna(s) used for reception may not be situated optimally for the reception of signals from local base stations. This limitation unfortunately restricts the ability of a femtocell to optimally configure itself. The result is more interference among base stations, which ultimately translates to decreased network capacity and more dropped connections resulting in femtocells operating less optimally than possible.

Once the survey is complete, the femtocell configures itself as best it can with the information it has received, and then switches into operational mode. The survey is periodically repeated to insure that the femtocell is provided with current information about its network environment.

OVERVIEW

A method and apparatus for configuring a first cellular base station such as a femtocell to operate in a digital cellular telecommunications network includes: placing the first cellular base station in the digital cellular telecommunications network; detecting with a radio receiver at least one second operating cellular base station within the digital cellular telecommunications network; demodulating a first transmission of the at least one second cellular base station transmitter to obtain a first data stream; predictively modifying the first data stream to create a modified first data stream; correlating at least one periodic portion of the modified first data stream to form an enhanced data signal; decoding the enhanced data signal to obtain information; and configuring the first cellular base station with the information.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

In the drawings:

FIG. 3 is a schematic diagram of a conventional cellular base station.

FIG. 4 is a process flow diagram of a process for configuring a femtocell in accordance with an embodiment of the present invention.

FIG. 5 is a schematic diagram of a cellular base station in accordance with an embodiment of the present invention.

DESCRIPTION OF EXAMPLE EMBODIMENTS

Figure 1:
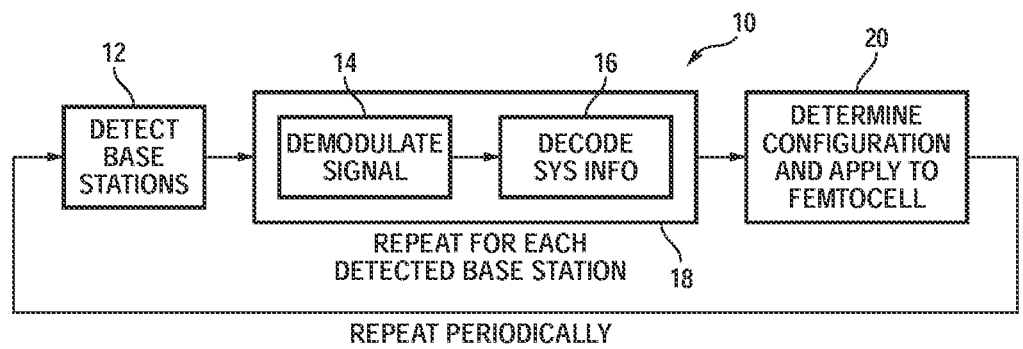
FIG. 1 is a process flow diagram of a process for configuring a femtocell in accordance with the prior art.

Example embodiments are described herein in the context of methods and circuitry useable in a digital cellular telecommunications receiver. Those of ordinary skill in the art will realize that the following description is illustrative only and is not intended to be in any way limiting. Other embodiments will readily suggest themselves to such skilled persons having the benefit of this disclosure. Reference will now be made in detail to implementations of the example embodiments as illustrated in the accompanying drawings. The same reference indicators will be used to the extent possible throughout the drawings and the following description to refer to the same or like items.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with this disclosure, the components, process steps, and/or data structures described herein may be implemented using various types of operating systems, computing platforms, computer programs, and/or general purpose machines. In addition, those of ordinary skill in the art will recognize that devices of a less general purpose nature, such as hardwired devices, FPGAs, ASICs, or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Eraseable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card, paper tape and the like) and other types of program memory.

The technique of Predictive SVI (PSVI) is described herein in detail in the context of standard UMTS (Universal Mobile Telecommunications System)/WCDMA (Wideband Code Division Multiple Access) femtocells. UMTS/WCDMA is a third generation (3G) cellular network technology standard. The concept described herein of utilizing PSVI is useable with such network technologies, earlier network technologies and future network technologies. With this description, those of ordinary skill in the art will be readily able to adapt the technique of PSVI to other cellular network technologies.

Turning now to the figures, FIG. 1 illustrates a conventional femtocell configuration process 10 in the absence of any form of SVI. In the process 10, the femtocell (which may be implemented as an appliance-type hardware device operating under the control of software code) is powered on and detects base stations which may be nearby 12. For each base station detected the signal received from the base station is demodulated 14 and SysInfo is acquired through decoding of the demodulated signal 16 in a single pass process 18 which is repeated for each base station. Once acquired, the SysInfo is used at 20 to configure the femtocell. The process 10 is periodically repeated to insure current information is available to the femtocell.

Figure 2:
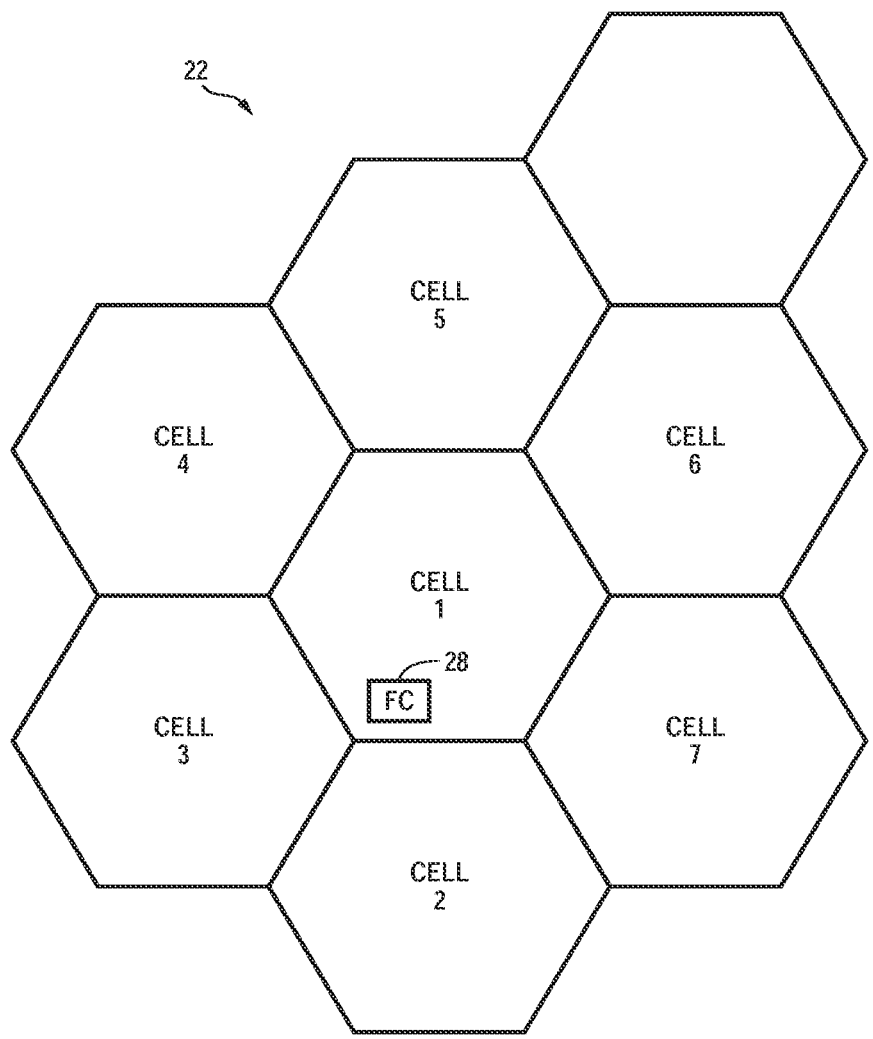
FIG. 2 is a schematic diagram of a portion of an idealized digital cellular telecommunications network.

FIGS. 2 and 3 illustrate a simplified cellular network 22 having a number of cells (Cell 1, Cell 2, Cell 3, Cell 4, Cell 5, Cell 6 and Cell 7) deployed in an idealized manner. Each Cell has at least one cellular base station transmitter/receiver 24 and at least one corresponding antenna system 26 for transmitting and receiving signals. Femtocell 28 is deployed within the cellular network 22, generally within range of more than one cell's base station. It may be deployed within a nominal cell boundary or at an edge. Femtocell 28 has its own at least one base station transmitter/receiver and corresponding at least one antenna just as in FIG. 3, but will generally be less capable because it will generally be designed to serve a smaller population of users.

Predictive SVI Background: Application of SVI to the reception of cellular SysInfo requires some modifications to what is known as the classical SVI approach. This modified SVI approach is referred to herein as "Predictive SVI" or "PSVI", based on its ability to predict the variations seen at the receiver caused by known changes in the underlying data, and use this knowledge to restore the data to a state where classical SVI can be applied.

Classical SVI is a known signal processing technique for improving the received signal quality of periodic waveforms by integrating ("correlating") repeated copies of the same data. This technique works well but is limited to strictly periodic data, i.e., data that repeats exactly. Improved reception of the SysInfo messages broadcast by cellular base stations is desired; however, because transmitted SysInfo is not strictly periodic, the use of classical SVI is precluded. PSVI offers a method for restoring strict periodicity to quasi-periodic SysInfo in order to enable use of SVI techniques for enhanced data recovery.

The quasi-periodic nature of cellular SysInfo can be understood by examining the transmission model for such information. This model is described below in detail for the specific case of UMTS/WCDMA. As pointed out above, other cellular technologies operate in a similar manner and those of ordinary skill in the art having the benefit of this disclosure will be able to apply the PSVI techniques described herein to them, as desired.

In accordance with the present invention PSVI is added to the processing chain as illustrated generally in FIG. 4. PSVI dramatically improves reception of SysInfo from neighboring cellular base stations. Specifically, SysInfo can be recovered from more neighboring cellular base stations. SysInfo can be obtained from cellular base stations that are farther away, have lower transmit power (e.g., other femtocells), or whose signal path is obstructed (by buildings, trees, and the like). PSVI also enables faster SysInfo recovery in marginal SINR cases. This is because PSVI averages together (correlates) a large number of noisy copies of the transmitted SysInfo, rather than taking the time necessary for a clean copy to randomly occur at the receiver. More specifically, FIG. 4 illustrates a PSVI femtocell configuration process 40 in accordance with an embodiment of the invention. In the process 40, the femtocell (which may be implemented as an appliance-type hardware device operating under the control of software code) is powered on and detects base stations which may be nearby 42. For each base station detected the signal received from the base station is demodulated 44 and SysInfo data is acquired. The data is manipulated (predictive modification) to counter the effects of transmission which operate to make it not strictly periodic 46. When the data is rendered periodic once again SVI is used to coherently integrate or "correlate" the data over a plurality of transmissions so as to improve the reception quality 48. Then the SysInfo is decoded 50 using a priori knowledge of the cellular telecommunication network protocol in use. (Steps 44-50 may be repeated for each or a selected subset of base stations detected). Once acquired, the SysInfo is used at 52 to configure the femtocell. The process 40 is periodically repeated to insure current information is available to the femtocell.

In order to explain predictive modification of a received and demodulated data stream as carried out in the PSVI process and how it differs from a classical SVI process, as a (very simplified) example, suppose that the SysInfo to be acquired was represented by the bits 010. (Now, in reality a great many more bits would be involved, however this example should serve to make clearer the process of PSVI as contemplated herein). The value 010 is sent repeatedly and periodically without anything acting to disrupt the periodicity of the signal. A receiver subject to noise and interference receives, say, 010 001 010 011 110 010 010 000 010 010. Using an SVI approach one would count 9 of 10 occurrences of 0 in the first bit slot, 8 of 10 occurrences of 1 in the second bit slot, and 8 of 10 occurrences of 0 in the third bit slot. Using any number of statistical and mathematical fitting algorithms it would be correct then to conclude that in all likelihood, what was originally sent was 010. This is, in essence, the technique of classical SVI.

In cellular telephone networks where periodic data is modified to become quasi-periodic data for various reasons having to do with its encoding and transmission, but where the rules governing that modification are known or knowable, it is possible to "predictively modify" the received data stream back to one having periodic components and then apply SVI techniques for signal enhancement. Thus, assume that the original signal sent was a repeating 010, i.e., 010 010 010 010 010 010 010 010 010 010. However, the various encoding and transmission techniques applied had the effect of causing the $2^{nd}$, $4^{th}$, etc. three-bit groups to become XORed so that the signal transmitted became: 010 101 010 101 010 101 010 101 010 101. Now, suppose the signal actually received (subject to noise and interference) is: 010 110 010 100 110 101 010 111 010 101. Without applying predictive modification one would count 6 of 10 occurrences of 1 in the first bit slot, 7 of 10 occurrences of 1 in the second bit slot, and 7 of 10 occurrences of 0 in the third bit slot which might cause one to conclude that the original data was 110—which would be wrong. Using predictive modification in this case one would undo (or invert) the XOR to the $2^{nd}$, $4^{th}$, etc. bit groups to reform the original data stream thus obtaining: 010 001 010 011 110 010 010 000 010 010. Using an SVI approach on the predictively modified data stream one would then count 9 of 10 occurrences of 0 in the first bit slot, 8 of 10 occurrences of 1 in the second bit slot, and 8 of 10 occurrences of 0 in the third bit slot. As before, using any number of statistical techniques well known to those of ordinary skill in the art of signal processing, it would be correct then to conclude that in all likelihood, what was originally sent was 010. This would be correct and this approach (although greatly simplified) is the essence of PSVI.

FIG. 5 illustrates a femtocell cellular base station 54 in accordance with an embodiment hereof. The femtocell includes a transmitter 56 for transmitting signals to the cellular communications network, a receiver 58 for receiving signals from the cellular communications network, and at least one antenna 60 coupled to transmitter 56 and receiver 58. One or more processors 62 and memory 64 are programmed to perform detector functions (detection of nearby cellular base stations); demodulator functions (demodulation of analog signals from receiver 54 to digital data streams); predictive modifier functions (inversion of processes used by other cellular base stations prior to transmission to restore periodicity to the received data stream); correlator functions (statistical enhancement of periodic data streams); decoder functions (decoding of portions of the received data stream to provide information); and configure functions (application of information to configuration of the femtocell).

Some specific examples of how femtocell configuration can be improved by using the SysInfo of neighboring cells in real cellular communications networks are described below.

Neighbor Lists:

Each base station transmits a neighbor list (a list of scrambling codes being used by nearby base stations) as part of its SysInfo. The neighbor list is important because it tells cellular devices (e.g., cell phones and similar devices) in that particular cell what other base stations they might be handed off to. Neighbor lists are therefore important for seamless network operation as users move around. When a new femtocell is dropped into the network, it needs to be able to figure out what its neighboring cells are so that it can include them in its neighbor list. It can do this to first order with the base station detector, which provides the scrambling code of each neighboring base station within range. However, this may lead to some omissions, because in some cases, the femtocell antenna is not arranged in a line-of-sight orientation with a neighboring base station that nevertheless has an overlapping coverage area and therefore should indeed be in the neighbor list. A more thorough way is to receive the neighbor lists transmitted by each neighboring cell, and use this as the basis for the neighbor list of the femtocell being configured.

PSC Selection:

In accordance with the UMTS/WCDMA standard, each base station transmits using a scrambling code called a Primary Scrambling Code (PSC), which is drawn from a set of 512 known codes. In order to minimize interference, the same PSC should not be used by different base stations with overlapping coverage areas—in fact, network providers typically try to keep these instances of PSC re-use as geographically far away as possible (part of this has to do with the fact that neighbor lists are specified by PSC, so PSC is treated by the network as being unique within a localized area). When a new femtocell is dropped into the network, it needs to choose what PSC to use. This is typically done by using the base station detector results, which provides the scrambling code of each neighboring base station within range. However, this is sub-optimal for two reasons. First, if the femtocell does not have line of sight to a neighboring base station it may not be able to detect it at all, which means it will not know that this PSC is already in use nearby. Secondly, this method only gives PSC usage information for a very localized area; PSC usage by base stations that lie just beyond the detection range will not be discovered. A better approach is to recover the neighbor lists from as many base stations as possible. Collectively, the neighbor list information provides a thorough account of what PSCs are in use in the local area. The femtocell can then safely choose any PSC that does not appear in any of the neighbor lists.

Location Area:

A location area is defined as a hierarchical group of cells—they are grouped by the network to facilitate network operation and to make the overall network more efficient. Each cell belongs to a particular location area, and transmits its location area code (LAC) as part of the SysInfo. Receiving the SysInfo from neighboring cells can help a femtocell to make the best choice for what LAC it should use.

SysInfo is broadcast by each base station in a cellular network. The same information is repeatedly broadcast roughly every few seconds in order to provide timely information to phones that may be trying to acquire the network at any particular time. UMTS/WCDMA SysInfo is comprised of several different messages called System Information Broadcast (SIB) messages. There are different types of SIBs (e.g., Type 1, Type 2, and the like) that carry different types of information. Not all SIB types are necessarily transmitted; each base station may transmit its own subset of the predefined SIB types. Within each SIB type, the contents of repeated messages are identical; for example, each SIB Type 1 message contains the exact same data as all of the others. However, in the process of being mapped to the physical layer for transmission, these identical messages go through several steps that erode this strict periodicity, resulting in a transmitted signal that is only quasi-periodic. The details of this transmission process are described in the following paragraphs for the purposes of predictive modification. Other cellular telecommunications protocols will vary somewhat in detail, however the approach to predictive modification will be essentially the same.

The first step undergone by the SIB messages is segmentation. In this step, variable-length SIB messages are "chopped up" into fixed-length segments. The next step involves time-multiplexing the various SIB segments into a single data stream called the BCH transport channel, which consists of 20 ms (millisecond) transport blocks. Each transport block can carry a single SIB segment, and also contains a system frame number (SFN), which is an 11-bit sequential counter. Each SIB type is allowed to have its own repetition period, as scheduled by the base station. For example, SIB Type 1 messages may be configured to repeat every 320 ms, while SIB Type 2 may repeat every 640 ms. A special type of SIB, called the Master Information Block (MIB), indicates which other SIB types are present and what repetition period is used for each one. The MIB is always present and repeats every 80 ms.

The BCH transport blocks then undergo a series of physical layer processing steps that prepare the data for transmission over the air interface. First, each transport block is encoded with a 16-bit CRC (cyclic redundancy check) which is appended to the end of the transport block. The data is then encoded with a rate ½ convolutional code with a constraint length of 9. The data then goes through two interleaving steps before being mapped onto a specific physical channel (called the P-CCPCH) for transmission over the air interface.

With an understanding of the transmission model in place, it is now possible to explain in detail what is meant by calling the SysInfo data a quasi-periodic signal. First note that although successive copies of corresponding SIB segments are themselves periodic, the composite transport channel is not periodic because it contains many different SIB types multiplexed together, with each one potentially repeating at a different period. Furthermore, even if the transport block stream only contained a single SIB type it still would not be strictly periodic. This can be seen by considering two successive transport blocks that carry identical SIB segments. Although they contain the same payload data, these blocks will have different SFN values. During CRC encoding, these different SFN values cause the resulting 16-bit CRC's to differ. The differences in the SFN and CRC bits are then amplified by the convolutional encoding process, because each differing bit at the input to the encoder causes up to 9 bits to be different at the encoder output due to the encoder memory (constraint length=9). Bit differences are further propagated by the interleaving steps. The net result of all of these effects is to obscure the underlying periodicity of the SIB messages, and to render classical SVI unusable. PSVI, on the other hand, manipulates received data, specifically the data that carries the SysInfo messages, to restore the periodicity so that classical SVI can be applied. The details of an embodiment of the PSVI technique are now explained.

Description of Input to PSVI (specific to UMTS/WCDMA):

PSVI input consists of received P-CCPCH bits as described in Section 5.3.3.3 of $3^{rd}$ Generation Partnership Project; Technical Specification Group Radio Access Network; Physical channels and mapping of transport channels onto physical channels (FDD); Release 7; 3GPP Specification Document TS 25.211 Version 7.3.0 Revised 2007-09.

It is assumed that the transmission gaps at the beginning of each slot have already been removed, so that each slot contains 18 bits. Each frame (15 slots) therefore contains 270 P-CCPCH bits. The input is assumed to contain at least 200 consecutive frames (2 seconds worth of data). Generally speaking the results improve as the amount of input data increases.

Outline of PSVI Steps (Specific to UMTS/WCDMA):

The following is a top-level overview of steps implementing PSVI. Details are provided in the paragraphs that follow.
 1. De-interleave each received frame
 2. Group the de-interleaved frames into P-CCPCH blocks (2 possible groupings)
 3. Apply SVI to MIB
  For each P-CCPCH block grouping:
  3a. De-interleave each P-CCPCH block
  3b. Determine the MIB starting block
  3c. Find SFN of the MIB starting block
  3d. Derive and apply corrections to restore MIB block invariance
  3e. Integrate MIB blocks (classical SVI)
  3f. Decode MIB block
 4. Determine correct P-CCPCH block grouping (from Step 2)
 5. Group SIB segments
 6. Process each SIB segment group:
  6a. Derive and apply corrections for each SIB segment group
  6b. Integrate SIB segments (classical SVI)
  6c. Decode SIB segment
 7. Process each SIB type:
  7a. Reassemble SIB message (if segment CRCs all check)
  7b. Apply ASN1 decoding to each reassembled SIB message Step 1: De-Interleave Each Received Frame:

This is a standard de-interleaving step that undoes the "$2^{nd}$ interleaving" step applied at the transmitter. This step is described in detail in Sec 4.2.11 of $3^{rd}$ Generation Partnership Project; Technical Specification Group Radio Access Network; Multiplexing and channel coding (FDD); Release 7; GPP Specification Document TS 25.212 Version 7.6.0 Revised 2007-09. In this case, the parameter R2=9.

Step 2: Group the De-Interleaved Frames into P-CCPCH Blocks (Two Possible Groupings):

A P-CCPCH block is defined here to be a group of 2 consecutive radio frames output by the previous de-interleaving step. Each P-CCPCH block therefore contains 270*2=540 bits and represents 20 ms. Note that there are two possible ways to group the frames into P-CCPCH blocks: starting with even frames and starting with odd frames. Each of these groupings is generated here. Specifically:
 2-1. Let the input frames be numbered 0, 1, 2, etc.
 2-2. P-CCPCH block group #1 contains:
  2-2a. P-CCPCH Block 0 (frame 0, frame 1)
  2-2b. P-CCPCH Block 1 (frame 2, frame 3)
  2-2c. P-CCPCH Block 2 (frame 4, frame 5)
  2-2d. Etc.
 2-3. P-CCPCH block group #2 contains:
  2-3a. P-CCPCH Block 0 (frame 1, frame 2)
  2-3b. P-CCPCH Block 1 (frame 3, frame 4)
  2-3c. P-CCPCH Block 2 (frame 5, frame 6)
  2-3d. Etc.

Step 3: Apply SVI to MIB:

This step applies the PSVI technique to the Master Information Block (MIB). Note that the sub-steps 3a-3f are repeated for each of the two P-CCPCH block groupings generated in the previous Step 2.

Step 3a: De-Interleave Each P-CCPCH Block:

This is a standard de-interleaving step that undoes the "1$^{st}$ interleaving" step applied at the transmitter. This step is described in detail in Sec 4.2.5 of 3$^{rd}$ *Generation Partnership Project; Technical Specification Group Radio Access Network; Multiplexing and channel coding (FDD); Release 7; GPP Specification Document TS 25.212 Version 7.6.0 Revised* 2007-09. In this case, the parameter C1=2 and R1=270.

Step 3b: Determine the MIB Starting Block:

MIB blocks are guaranteed to occur every 80 ms in UMTS/WCDMA, which means that every fourth P-CCPCH block contains an MIB. However, it is unknown whether the first received MIB appears in the first, second, third or fourth received block. The MIB starting block can be determined as follows:

3b-1. Let the de-interleaved P-CCPCH blocks (resulting from Step 3a) be numbered 0, 1, 2, etc. Make sure that the total number of blocks is a multiple of 4 by discarding the highest numbered blocks if necessary.

3b-2. Group the blocks into 4 groups as follows:
   3b-2a. Group 0 contains every fourth block starting with block 0
   3b-2b. Group 1 contains every fourth block starting with block 1
   3b-2c. Group 2 contains every fourth block starting with block 2
   3b-2d. Group 3 contains every fourth block starting with block 3

3b-3. For each group:
   3b-3a. Form a matrix whose rows correspond to each block in the group
   3b-3b. Sum down the columns of the matrix, resulting in the vector 's'
   3b-3c. Take the absolute value of each element in vector 's', and add the absolute values together. Define this quantity as the score for group 'i'.

3b-4. Determine which group has the largest score. Define the MIB starting block as block 'i', where group 'i' has the largest score.

Step 3c: Find SFN of the MIB Starting Block:

The system frame number (SFN) of the data must be recovered before PSVI can be applied. Although the SFN is contained in each P-CCPCH block, the presumption here is that the data fidelity is too low (due to noise and interference) to allow reliable direct recovery of the SFN—otherwise one could just directly recover all of the data and there would be no need for SVI. Instead, a trial-and-error approach is used in which a hypothesis test is performed for each possible SFN value. The specific steps are as follows:

3c-1. Define the set of blocks B as the group with the largest score in Step 3b. Number the blocks in B from 0 to N−1.

3c-2. Define the set of possible base SFN values as (0, 4, 8, 12, . . . 2044)

3c-3. For each possible base SFN value 'b'
   3c-3a. For each block 'k' within the set B (k from 0 to N−1)
      3c-3a(i). Compute the correction mask for block k as follows:
         3c-3a(i)(1) Compute the XOR of b and (b+4*k) mod 2048, where each of these two quantities is represented as an 11-bit binary number. The resulting XOR also has 11 bits.
         3c-3a(i)(2) Build a 246-bit transport block whose first 11 bits contain the XOR from the previous step, and whose remaining 235 bits are 0.
         3c-3a(i)(3) Compute the 16-bit CRC on the 246 bits from the previous step and append the CRC bits to the end of the 246 bits to create a 262-bit block. This is described in Section 4.2.1 of 3$^{rd}$ *Generation Partnership Project; Technical Specification Group Radio Access Network; Multiplexing and channel coding (FDD); Release 7; GPP Specification Document TS 25.212 Version 7.6.0 Revised* 2007-09.
         3c-3a(i)(4) Input the 262-bit block from the previous step to the rate ½ convolutional encoding step described in Section 4.2.3.1 of 3$^{rd}$ *Generation Partnership Project; Technical Specification Group Radio Access Network; Multiplexing and channel coding (FDD); Release 7; GPP Specification Document TS 25.212 Version 7.6.0 Revised* 2007-09. This results in a 540-bit block.
         3c-3a(i)(5) The result of this process is the 540 bit "correction mask". Each '1' indicates that the (postulated) SFN difference between the two blocks caused a bit difference in that position to occur between the block 0 and block k.
      3c-3a(ii) Replace each 1 in the correction mask with a −1, and replace each 0 with a 1. Pair-wise multiply this correction mask with block 'k'. The result has 540 elements.
      3c-3a(iii) Keep a running element-by-element sum of the result of the previous step over all blocks for this particular base SFN value.
   3c-3b. Square each of the 540 elements from the running sum, and add them together. Record this value as the SVI magnitude for base SFN 'b'.

3c-4. Find the maximum SVI magnitude over all base SFN values. The corresponding base SFN is determined to be the SFN of the first block in B.

Step 3d: Derive and Apply Corrections to Restore MIB Block Invariance:

The idea behind this step is to predict the changes that will be caused in each MIB block due to the incrementing SFN, and then apply the proper corrections to the data so that successive MIB blocks are truly identical. This is necessary before applying the classical SVI technique, which integrates successive blocks.

3d-1. Start with the set of blocks 'B' formed in Step 1 of the previous step 3d-2. Let 'b' be the base SFN found in the previous step 3d-3. For each block 'k' within the set B (for k from 0 to N−1):
   3d-3a. Compute the correction mask for block k as follows:
      3d-3a(i). Compute the XOR of 'b' and (b+4*k) mod 2048, where each of these two quantities is represented as an 11-bit binary number. The resulting XOR also has 11 bits.
      3d-3a(ii). Build a 246-bit transport block whose first 11 bits contain the XOR from the previous step, and whose remaining 235 bits are 0.
      3d-3a(iii). Compute the 16-bit CRC on the 246 bits from the previous step and append the CRC bits to the end of the 246 bits to create a 262-bit block. This is described in Section 4.2.1 of 3$^{rd}$ *Generation Partnership Project; Technical Specification*

Group Radio Access Network; Multiplexing and channel coding (FDD); Release 7; GPP Specification Document TS 25.212 Version 7.6.0 Revised 2007-09.

3d-3a(iv). Input the 262-bit block from the previous step to the rate ½ convolutional encoding step described in Section 4.2.3.1 of $3^{rd}$ Generation Partnership Project; Technical Specification Group Radio Access Network; Multiplexing and channel coding (FDD); Release 7; GPP Specification Document TS 25.212 Version 7.6.0 Revised 2007-09. This results in a 540-bit block.

3 d-3a(v). The result of this process is the 540 bit "correction mask". Each '1' indicates that the (postulated) SFN difference between the two blocks caused a bit difference in that position to occur between the block 0 and block k.

3 d-3a(vi). Replace each 1 in the correction mask with a −1, and replace each 0 with a 1.

3d-3b. Pair-wise multiply the correction mask with block 'k'. Let the 540 element result be the kth row of a new matrix 'M', which has dimensions N×540.

Step 3e: Integrate MIB Blocks (Classical SVI):

Now that the successive MIB blocks have been made truly invariant by the previous step, classical SVI is applied:

3e-1. Start with the N×540 matrix 'M' formed in the previous step.

3e-2. Sum the elements in each column of M, forming a 540 element vector 'c'. Intuitively, this vector represents a "cleaned up" version of the MIB, since many copies of the same signal (each with uncorrelated noise) have been coherently averaged together.

Step 3f: Decode MIB Block:

Here the standard channel decoding steps are applied to the cleaned up MIB block. Note that the de-interleaving steps are not necessary here because they were already done in previous steps.

3f-1. Start with the 540 element vector 'c' formed in the previous step.

3f-2. Apply a standard rate ½ Viterbi decoder, resulting in a 262-bit output.

3f-2a. Details of the convolutional encoding process are described in Sec 4.2.3.1 of $3^{rd}$ Generation Partnership Project; Technical Specification Group Radio Access Network; Multiplexing and channel coding (FDD); Release 7; GPP Specification Document TS 25.212 Version 7.6.0 Revised 2007-09.

3f-3. Run the 262-bit output from the previous step through a standard 16-bit CRC decoding process. This results in a 246-bit vector as well as a CRC check result (pass/fail).

3f-3a. Details of the CRC encoding process are described in Sec 4.2.1 of $3^{rd}$ Generation Partnership Project; Technical Specification Group Radio Access Network; Multiplexing and channel coding (FDD); Release 7; GPP Specification Document TS 25.212 Version 7.6.0 Revised 2007-09.

Step 4: Determine Correct P-CCPCH Block Grouping (from Step 2):

In this step, the ambiguity in the P-CCPCH block grouping from Step 2 is resolved. This is done by seeing which of the two possible groupings (if any) resulted in a positive CRC check in the previous step.

4-1. Label the CRC result from the previous step "CRC1", when P-CCPCH block group #1 (from Step 2) is used as input. Label the CRC result "CRC2" when P-CCPCH block group #2 (from Step 2) is used as input.

4-2. There are four possible results for the two CRCs:

4-2a. If CRC1 passes and CRC2 fails, this indicates that group #1 is the correct grouping. Continue to Step 5, and define the de-interleaved P-CCPCH blocks in subsequent steps as the data resulting from the first pass of Step 3a.

4-2b. If CRC2 passes and CRC1 fails, this indicates that group #2 is the correct grouping. Continue to Step 5, and define the de-interleaved P-CCPCH blocks in subsequent steps as the data resulting from the second pass of Step 3a.

4-2c. If both CRCs fail, abort processing. Typically this means that signal quality is too poor to process successfully. In some cases it may be useful to go back to Step 1 and repeat the entire processing chain using more input data.

4-2d. If both CRCs pass, go back to Step 1 and repeat the entire processing chain using different input data. Note that this condition is extremely rare.

Step 5: Group SIB Segments:

Having recovered the MIB, the next step is to recover the other System Information Blocks (SIBs) that carry the System Information. As with the MIB, first group repeated copies of each message before applying SVI. However, unlike the MIB, the other System Information Blocks (SIBs) are not broadcast at known times with known repetition rates. Instead, these scheduling parameters are set by the network and transmitted as part of the MIB. The standard procedure is for phones to first decode the MIB in order to learn what SIB types are present, and when they are expected to occur, before attempting to recover the other SIBs. A similar procedure is used here. In addition, SIB messages are typically segmented before being transmitted on the P-CCPCH. In other words, each P-CCPCH block in general contains a segment of a SIB message, rather than an entire message. The goal of this step is to group together the P-CCPCH blocks that carry repetitions of the same segment. For example, suppose that the SIB5 message contains 3 segments. Then form three groups for SIB5: one containing all of the first segments, one containing all of the second segments, and one containing all of the third segments.

5-1. Start with the 246-bit vector from Step 3f (corresponding to the P-CCPCH block grouping that resulted in a CRC pass).

5-2. Extract the 'data field' portion of this 246-bit segment, as described in Section 8.1.1.1.3 of $3^{rd}$ Generation Partnership Project; Technical Specification Group Radio Access Network; Radio resource control (RRC); Protocol specification; Release 7; GPP Specification Document TS 25.331 Version 7.5.0 Revised 2007-06.

5-3. Perform ASN1 decoding of the MIB block. Details on ASN1 decoding are described in *International Telecommunication Union ITU-T Recommendation X680 (July 2002) "Information Technology—Abstract Syntax Notation One (ASN.1): Specification of basic notation", International Telecommunication Union ITU-T Recommendation X681 (July 2002) "Information Technology—Abstract Syntax Notation One (ASN.1): Information object specification", and International Telecommunication Union ITU-T Recommendation X691 (July 2002) "Information technology—ASN.1 encoding rules: Specification of Packed Encoding Rules (PER)".* The ASN1 definitions from Section 11 of $3^{rd}$ Generation Partnership Project; Technical Specification Group Radio Access Network; Radio resource control (RRC); Protocol specification; Release 7; GPP Specification Document TS 25.331 Version 7.5.0 Revised 2007-06 are used.

5-4. The decoded MIB provides SIB scheduling information indicating when the other SIB segments occur. This information is described in detail in Section 8.1.1.1.5 of 3$^{rd}$ Generation Partnership Project; Technical Specification Group Radio Access Network; Radio resource control (RRC); Protocol specification; Release 7; GPP Specification Document TS 25.331 Version 7.5.0 Revised 2007-06.

5-5. Use the recovered SIB scheduling information to group together de-interleaved P-CCPCH blocks (result of Step 4) containing repeated instances of each SIB segment.

5-6. As the blocks are grouped, keep track of the SFN associated with each block. The SFN of each block can be determined using the base SFN derived in Step 3c.

Step 6: Process Each SIB Segment Group:

Execute steps 6a and 6b for each SIB segment group.

Step 6a: Derive and Apply Corrections for Each SIB Segment Group:

6a-1. Start with the group of de-interleaved P-CCPCH blocks for a particular SIB segment. Let the number of blocks in the group be $N_B$.

6a-2. Designate the first block in the group as the reference block. This block's SFN is the reference SFN.

6a-3. For each block 'k' within the group (for k from 0 to $N_B-1$):

6a-3a. Compute the correction mask for block k as follows:

6a-3a(i). Compute the XOR of the SFN of block 'k' and the reference SFN, where each of these two quantities is represented as an 11-bit binary number. The resulting XOR also has 11 bits.

6a-3a(ii). Build a 246-bit transport block whose first 11 bits contain the XOR from the previous step, and whose remaining 235 bits are 0.

6a-3a(iii). Compute the 16-bit CRC on the 246 bits from the previous step and append the CRC bits to the end of the 246 bits to create a 262-bit block. This is described in Section 4.2.1 of 3$^{rd}$ Generation Partnership Project; Technical Specification Group Radio Access Network; Multiplexing and channel coding (FDD); Release 7; GPP Specification Document TS 25.212 Version 7.6.0 Revised 2007-09.

6a-3a(iv). Input the 262-bit block from the previous step to the rate ½ convolutional encoding step described in Section 4.2.3.1 of 3$^{rd}$ Generation Partnership Project; Technical Specification Group Radio Access Network; Multiplexing and channel coding (FDD); Release 7; GPP Specification Document TS 25.212 Version 7.6.0 Revised 2007-09. This results in a 540-bit block.

6a-3a(v). The result of this process is the 540 bit "correction mask". Each '1' indicates that the (postulated) SFN difference between the two blocks caused a bit difference in that position to occur between the reference block and block k.

6 a-3a(vi). Replace each 1 in the correction mask with a −1, and replace each 0 with a 1.

6a-3b. Pair-wise multiply the correction mask with block 'k'. Let the 540 element result be the kth row of a new matrix 'M', which has dimensions $N_B \times 540$.

Step 6b: Integrate SIB Segments (Classical SVI):

Now that the successive SIB segments have been made truly invariant by the previous step, classical SVI is applied.

6b-1. Start with the $N_B \times 540$ matrix 'M' formed in the previous step.

6b-2. Sum the elements in each column of M, forming a 540 element vector 'c'. Intuitively, this vector represents a "cleaned up" version of the SIB segment, since many copies of the same signal (each with uncorrelated noise) have been coherently averaged together.

Step 6c: Decode SIB Segments:

Here standard channel decoding steps are applied to the cleaned up SIB segment. Note that the de-interleaving steps are not necessary here because they were already done in previous steps.

6c-1. Start with the 540 element vector 'c' formed in the previous step.

6c-2. Apply a standard rate ½ Viterbi decoder, resulting in a 262-bit output.

6c-2a. Details of the convolutional encoding process are described in Sec 4.2.3.1 of 3$^{rd}$ Generation Partnership Project; Technical Specification Group Radio Access Network; Multiplexing and channel coding (FDD); Release 7; GPP Specification Document TS 25.212 Version 7.6.0 Revised 2007-09.

6c-3. Run the 262-bit output from the previous step through a standard 16-bit CRC decoding process. This results in a 246-bit vector as well as a CRC check result (pass/fail).

6c-3a. Details of the CRC encoding process are described in Sec 4.2.1 of 3$^{rd}$ Generation Partnership Project; Technical Specification Group Radio Access Network; Multiplexing and channel coding (FDD); Release 7; GPP Specification Document TS 25.212 Version 7.6.0 Revised 2007-09.

Step 7: Process Each SIB Type:

Execute steps 7a and 7b.

Step 7a: Reassemble SIB Message:

In Step 5 it was determined how many SIB segments comprise each SIB message (e.g., SIB5 contains 3 SIB segments). Each SIB message is now reassembled from its constituent SIB segments. The following steps describe the procedure to be applied to each SIB message that is present.

7a-1. Check to make sure that each of the constituent SIB segments for this SIB message passed CRC during the decoding process for Step 6c.

7a-2. If each CRC passed:

7a-2a. Reassemble the SIB message from the constituent segments. SIB reassembly is a standard procedure described in Sections 8.1.1.1.3 and 8.1.1.1.4 of 3$^{rd}$ Generation Partnership Project; Technical Specification Group Radio Access Network; Radio resource control (RRC); Protocol specification; Release 7; GPP Specification Document TS 25.331 Version 7.5.0 Revised 2007-06.

7a-3. If not all CRC's passed, there are two options:

7a-3a. Collect more data and try again (applying SVI over a larger number of blocks increases the likelihood of success)

7a-3b. Skip decoding this SIB message 7a-3b(i). This means that some System Information parameters will not be recovered, which may be OK in some applications.

Step 7b: Apply ASN1 Decoding to Each Reassembled SIB Message:

7b-1. Perform ASN1 decoding of each reassembled SIB message from the previous step to recover the SysInfo contents. This is a standard processing step; details on ASN1 decoding are described in *International Telecommunication Union ITU-T Recommendation X.*680 (July 2002) *"Information Technology—Abstract Syntax Notation One (ASN.1): Specification of basic notation"*, *International Telecommunication Union ITU-T Recommendation X.*681 (July 2002) *"Information Technology—Abstract Syntax Notation One (ASN.1): Information object specification"*, and *International Telecommunication Union ITU-T Recommendation X.*691 (July 2002) *"Information technology—ASN.1 encoding rules: Specification of Packed Encoding Rules (PER)"*. The ASN1 definitions from Section 11 of *3rd Generation Partnership Project; Technical Specification Group Radio Access Network; Radio resource control (RRC); Protocol specification; Release 7; GPP Specification Document TS 25.331 Version 7.5.0 Revised* 2007-06 are used.

The following documents are technical standards documents applicable to UMTS/WCDMA telephony standards and are hereby incorporated herein by reference as if set forth fully herein:

(1) *3rd Generation Partnership Project; Technical Specification Group Radio Access Network; Physical channels and mapping of transport channels onto physical channels (FDD); Release 7; 3GPP Specification Document TS 25.211 Version 7.3.0 Revised* 2007-09;

(2) *3rd Generation Partnership Project; Technical Specification Group Radio Access Network; Multiplexing and channel coding (FDD); Release 7; GPP Specification Document TS 25.212 Version 7.6.0 Revised* 2007-09;

(3) *3rd Generation Partnership Project; Technical Specification Group Radio Access Network; Radio resource control (RRC); Protocol specification; Release 7; GPP Specification Document TS 25.331 Version 7.5.0 Revised* 2007-06;

(4) *International Telecommunication Union ITU-T Recommendation X.*680 (July 2002) *"Information Technology—Abstract Syntax Notation One (ASN.1): Specification of basic notation"*, (5) *International Telecommunication Union ITU-T Recommendation X.*681 (July 2002) *"Information Technology—Abstract Syntax Notation One (ASN.1): Information object specification"*, and (6) *International Telecommunication Union ITU-T Recommendation X.*691 (July 2002) *"Information technology—ASN.1 encoding rules: Specification of Packed Encoding Rules (PER)"*

While embodiments and applications have been shown and described, it would be apparent to those skilled in the art having the benefit of this disclosure that many more modifications than mentioned above are possible without departing from the inventive concepts disclosed herein. The invention, therefore, is not to be restricted except in the spirit of the appended claims.

What is claimed is:

1. A method for configuring a first cellular base station to operate in a digital cellular telecommunications network, the method comprising:
a) placing the first cellular base station in the digital cellular telecommunications network;
b) detecting with a radio receiver at least one second operating cellular base station within the digital cellular telecommunications network;
c) demodulating a first transmission of the at least one second operating cellular base station to obtain a first data stream;
d) predictively modifying the first data stream to restore a periodicity thereof and create a modified first data stream by forming and applying a correction mask, the forming and applying the correction mask comprising:
  i) determining a set of bit differences between data blocks of the first data stream at the at least one second operating cellular base station transmitter;
  ii) applying encoding and transmission processes used at the at least one second operating cellular base station transmitter to the set of bit differences to form the correction mask; and
  iii) creating the modified first data stream by applying the correction mask to selectively modify the bits of the first data stream;
e) summing at least two periodic portions of the modified first data stream to form an enhanced data signal;
f) decoding the enhanced data signal to obtain information; and
g) configuring the first cellular base station with the information.

2. The method of claim 1, further comprising:
periodically repeating steps (b) through (g).

3. The method of claim 1, further comprising:
repeating steps (c) through (g) for each second operating cellular base station detected in step (b).

4. The method of claim 1, wherein the digital cellular telecommunications network conforms to the UMTS/WCDMA standard protocol.

5. The method of claim 1, wherein said predictively modifying the first data stream to create a modified first data stream includes inverting at least one process applied to an original data stream by the at least one second operating cellular base station in creating the first transmission.

6. The method of claim 1, wherein said summing at least two periodic portions of the modified first data stream to form an enhanced data signal includes storing a plurality of versions of the modified first data stream in a memory and applying a statistical technique to the plurality of versions of the modified first data stream in the memory in order to create an enhanced data signal.

7. The method of claim 1, wherein the determining the set of bit differences between the data blocks of the first data stream comprises:
postulating a plurality of possible sets of bit differences;
computing a measure of signal invariance for each of the possible sets of bit differences; and
selecting a set of the plurality of possible sets of bit differences in accordance with the computed measures of signal invariance.

8. An apparatus for configuring a first cellular base station to operate in a digital cellular telecommunications network, the apparatus comprising:
a radio receiver;
means for detecting with the radio receiver at least one second operating cellular base station within the digital cellular telecommunications network;
means for demodulating a first transmission of the at least one second operating cellular base station to obtain a first data stream;
means for predictively modifying the first data stream to restore a periodicity thereof and create a modified first data stream using means for forming and applying a correction mask, the means for forming and applying the correction mask comprising:

means for determining a set of bit differences that occur between data blocks of the first data stream at the at least one second operating cellular base station transmitter;

means for applying encoding and transmission processes used at the at least one second operating cellular base station transmitter to the set of bit differences to form the correction mask; and means for creating the modified first data stream by applying the correction mask to selectively modify the bits of the first data stream;

means for summing at least two periodic portions of the modified first data stream to form an enhanced data signal;

means for decoding the enhanced data signal to obtain information; and means for configuring the first cellular base station with the information.

9. The apparatus of claim 8, wherein the digital cellular telecommunications network conforms to the UMTS/WCDMA standard protocol.

10. The apparatus of claim 8, wherein the means for predictively modifying the first data stream to create a modified first data stream includes means for inverting at least one process applied to an original data stream by the at least one second operating cellular base station in creating the first transmission.

11. The apparatus of claim 8, wherein the means for summing at least two periodic portions of the modified first data stream to form an enhanced data signal includes a memory and means for storing a plurality of versions of the modified first data stream in the memory and means for applying a statistical technique to the plurality of versions of the modified first data stream in order to create an enhanced data signal.

12. The apparatus of claim 8, wherein the means for determining the set of bit differences between the data blocks of the first data stream comprises:

means for postulating a plurality of possible sets of bit differences;

means for computing a measure of signal invariance for each of the possible sets of bit differences; and means for selecting a set of the plurality of possible sets of bit differences in accordance with the computed measures of signal invariance.

13. A first cellular base station configured for use in a digital cellular telecommunications network, the base station comprising:

a radio receiver configured to receive digital cellular telecommunications network signals;

a detector coupled to the radio receiver configured to detect at least one second cellular base station within the digital cellular telecommunications network;

a demodulator configured to demodulate a first transmission of the at least one second cellular base station to obtain a first data stream;

a predictive modifier configured to predictively modify the first data stream to restore a periodicity thereof and create a modified first data stream by forming and applying a correction mask, the predictive modifier further being configured to:

determine a set of bit differences that occur between data blocks of the first data stream at the at least one second operating cellular base station transmitter;

apply encoding and transmission processes used at the at least one second operating cellular base station transmitter to the set of bit differences to form the correction mask; and selectively modify the bits of the first data stream using the correction mask;

a correlator configured to sum at least two periodic portions of the modified first data stream to form an enhanced data signal;

a decoder configured to decode the enhanced data signal to obtain information; and a configurer configured to configure the first cellular base station with the information.

14. The base station of claim 13, wherein said predictive modifier is configured to invert one or more processes applied to an original data stream by the at least one second operating cellular base station in creating the first transmission in order to create the modified first data stream.

15. The base station of claim 13, further comprising a memory and wherein the correlator is configured to store a plurality of versions of the modified first data stream in the memory and apply a statistical technique to the plurality of versions of the modified first data stream in the memory in order to create the enhanced data signal.

16. The base station of claim 13, wherein the digital cellular telecommunications network conforms to the UMTS/WCDMA standard protocol.

17. The first cellular base station of claim 13, wherein, to determine the set of bit differences between the data blocks of the first data stream, the predictive modifier is further configured to:

postulate a plurality of possible sets of bit differences;

compute a measure of signal invariance for each of the possible sets of bit differences; and select a set of the plurality of possible sets of bit differences in accordance with the computed measures of signal invariance.

* * * * *